US007461204B2

United States Patent
Spencer et al.

(10) Patent No.: US 7,461,204 B2
(45) Date of Patent: Dec. 2, 2008

(54) METHOD TO STORE AND RETRIEVE MEMORY CARD USAGE INFORMATION

(75) Inventors: Andrew M. Spencer, Eagle, ID (US); Todd C. Adelmann, Boise, ID (US); Margo N. Whale, Kuna, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 96 days.

(21) Appl. No.: 09/996,720

(22) Filed: Nov. 30, 2001

(65) Prior Publication Data
US 2003/0105924 A1 Jun. 5, 2003

(51) Int. Cl.
*G06F 17/40* (2006.01)

(52) U.S. Cl. .......................... 711/115; 711/156; 710/18

(58) Field of Classification Search ................ 709/224; 710/15, 16, 18, 19; 711/115, 126, 147, 154, 711/156, 170, 173
See application file for complete search history.

(56) References Cited

U.S. PATENT DOCUMENTS

| | | | | |
|---|---|---|---|---|
| 4,887,161 A * | 12/1989 | Watanabe et al. | ........ | 348/231.7 |
| 5,499,113 A * | 3/1996 | Tsuboi et al. | ............... | 358/479 |
| 5,502,765 A * | 3/1996 | Ishiguro et al. | ............... | 705/67 |
| 5,532,689 A * | 7/1996 | Bueno | ........................ | 340/928 |
| 5,636,357 A * | 6/1997 | Weiner | ........................ | 711/115 |
| 5,745,102 A * | 4/1998 | Bloch et al. | .................. | 345/530 |
| 5,815,666 A * | 9/1998 | Kurihara | ..................... | 709/231 |
| 5,933,847 A * | 8/1999 | Ogawa | ........................ | 711/103 |
| 6,000,006 A * | 12/1999 | Bruce et al. | .................. | 711/103 |
| 6,363,468 B1 * | 3/2002 | Allison | ........................ | 711/173 |
| 6,489,932 B1 * | 12/2002 | Chitturi et al. | ................ | 345/30 |
| 6,587,140 B2 * | 7/2003 | No | ........................... | 348/207.2 |
| 2002/0107832 A1 * | 8/2002 | Shimizu et al. | ................. | 707/1 |
| 2002/0161571 A1 * | 10/2002 | Matsushima et al. | ......... | 704/200 |
| 2003/0136849 A1 * | 7/2003 | Adelmann | ................... | 235/492 |

OTHER PUBLICATIONS

Sega Dreamcast Visual memory Unit Instruction Manual, 1999, Sega of America, Inc.*
Sega DreamCast, Visual Memory Unit, Instruction Manual, 1999.*
www.corseairmemory.com/corsair/news_2001.html; /news_2000.html; /xms_xpert.html. Jun. 22, 2005. 5 pgs total.*
Corsair TWINXP1024-3200C2; -3200XL. Jan. 2005, Feb. 2005, respectively. 2pp ea.*

* cited by examiner

*Primary Examiner*—Donald Sparks
*Assistant Examiner*—Jared I Rutz

(57) ABSTRACT

A method, data structure, and system for storing memory card usage information on a memory card is provided. The method includes a step of collecting information about usage. The method also includes the steps of recording the information about usage in an area of the memory card, and accessing the information about usage.

23 Claims, 5 Drawing Sheets

Fig. 2
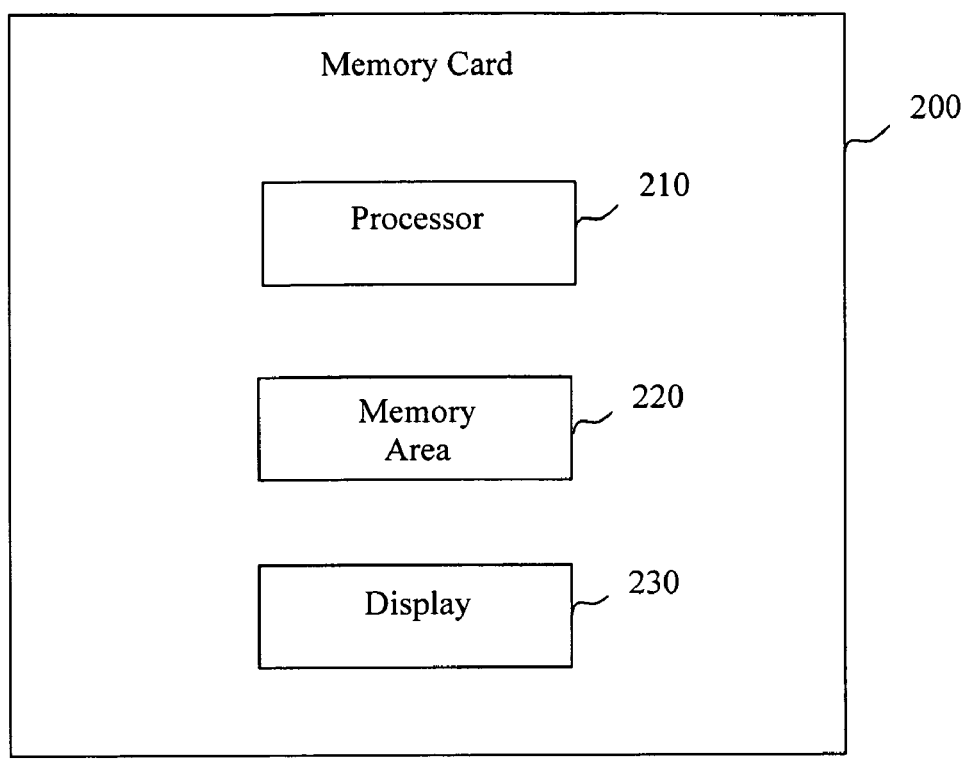
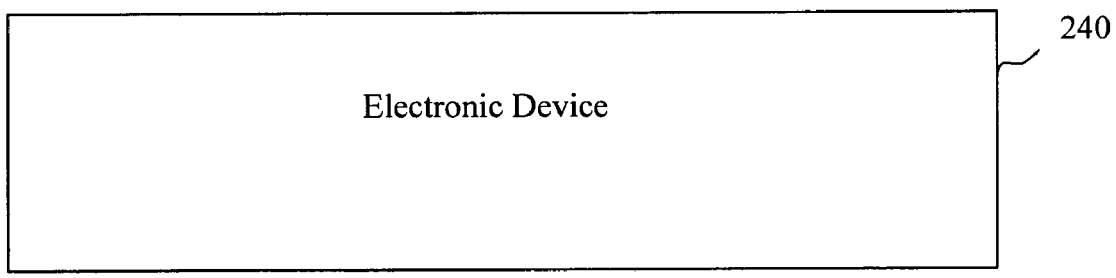

Fig. 3g

Count a number of times an image file was written to the memory card — 10g

Fig. 3h

Count physical insertions of the memory card into the electronic device — 10h

Fig. 3i

Count a number of times music files were written to the memory card — 10i

Fig. 3j

Track a number of times the memory card is formatted — 10j

Fig. 3k

Monitor an amount of memory used on the memory card — 10k1

Monitor an amount of memory remaining free on the memory card — 10k2

METHOD TO STORE AND RETRIEVE MEMORY CARD USAGE INFORMATION

BACKGROUND OF THE INVENTION

1. Field of the Invention

Present invention relates generally to the field of device usage monitoring, and more particularly, to the field of usage monitoring for memory cards.

2. Description of the Prior Art

With the advent of the broad use of memory cards, there is a need to determine how such memory cards are used across multiple hosts. The present invention is directed to solving this problem.

SUMMARY OF THE INVENTION

Briefly, the present invention comprises, in one embodiment, a method for storing memory card usage information on a memory card, comprising the steps of: collecting information about usage; recording the information about usage in an area of the memory card; and accessing the information about usage.

In a further aspect of the present invention, the monitoring step comprises monitoring write events, read events and power-on events.

In a further aspect of the present invention, the collecting step comprises changing a count associated with an event descriptor when the event occurs.

In a further aspect of the present invention, the collecting step comprises storing a value parameter associated with said event descriptor when the event occurs.

In a further aspect of the present invention, the collecting step comprises changing a memory tally associated with said event descriptor when the event occurs.

In a further aspect of the present invention, the recording step comprises recording the information about usage in a dedicated area in said memory card.

In a further aspect of the present invention, the recording step comprises recording the information about usage in a non-user accessible area of memory.

In a further aspect of the present invention, the collecting step comprises changing a count associated with an event description when the event occurs; and wherein the accessing step comprises displaying the count.

In a further aspect of the present invention, there are a plurality of event descriptors; and the accessing step comprises displaying a plurality of the event descriptors, wherein each of the displayed plurality of events descriptors is selectable, so that on selection, additional usage information will be displayed that is associated with that selected event descriptor.

In a further aspect of the present invention, the displaying step is performed at a host.

In a further aspect of the present invention, the accessing step comprises displaying substantially real-time information about usage in a window on a screen at a host.

In a further aspect of the present invention, the step of creating write and read commands allowing the host to store the information about usage and read that information.

In a further aspect of the present invention, the collecting step comprises changing a count associated with an event descriptor when the event occurs; and further comprising the steps of comparing the count to a threshold, and if the threshold is equaled or exceeded, then causing a message to be sent.

In a further embodiment of the present invention, a data structure is provided in a memory card, comprising, computer readable storage containing an event descriptor, and for each event descriptor a count representing the number of occurrences of that event.

In a further aspect of the present invention, for each of a plurality of event descriptors an amount of memory used by that aggregation of event descriptors is provided.

In a further embodiment of the present invention, a system is provided for storing memory card usage information on a memory card, comprising a component for collecting information about usage; a component for recording the information about usage in an area of the memory card; and a component for accessing the information about usage.

BRIEF DESCRIPTION OF THE DRAWINGS

FIG. 2 is a schematic illustrating a portable memory card for use with an electronic device according to an embodiment of the invention.

FIGS. 3a, 3b, 3c, 3d, 3e, 3f, 3g, 3h, 3i, 3j, and 3k are schematic block diagrams providing examples of step 10 of FIG. 1.

DETAILED DESCRIPTION OF THE PREFERRED EMBODIMENTS

Because of the wide use of portable memory cards in such devices as digital cameras, their use in recording music files, and their use to facilitate other applications, it has been determined that it would be useful to understand how the individual customer is using his/her memory card in order to provide the individual customer with tips for using their device more effectively, or for purchasing other devices. Additionally, the aggregation of this customer usage information across a wide pool of customers would provide manufacturers with necessary design information for improving mechanical interfaces for the card, for the determining the optimal size of the memories used with the individual devices and applications, for improving the design of reading and writing interfaces, as well as other design aspects.

Figure 1:
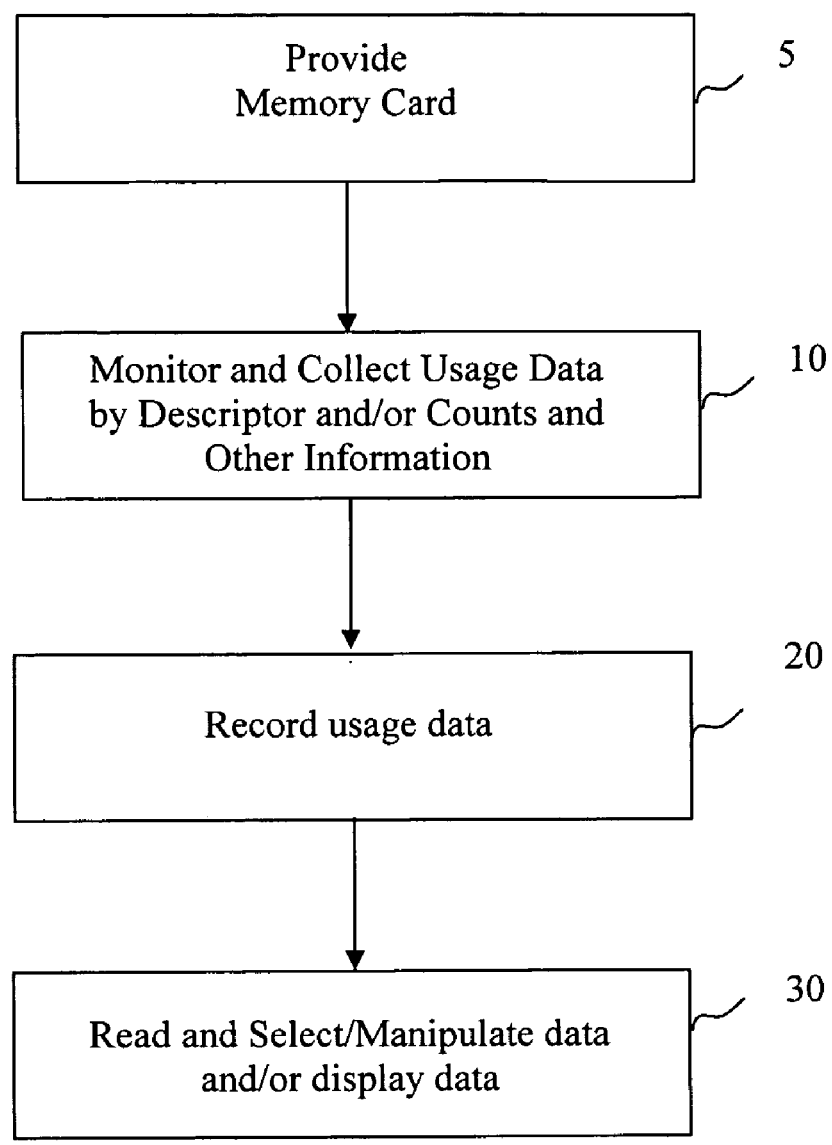
FIG. 1 is a schematic block diagram of a flowchart of a preferred embodiment of the present invention.
Figure 3A:
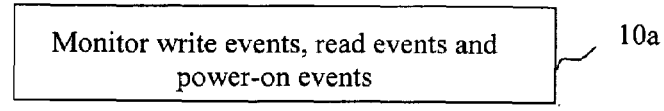
Figure 3B:
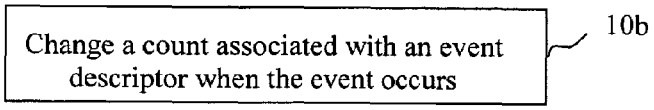
Figure 3C:
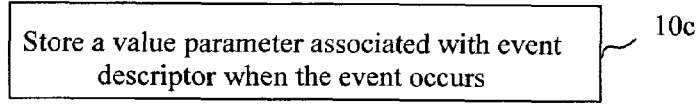
Figure 3D:
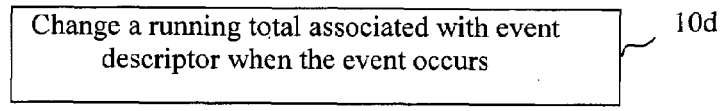
Figure 3E:
Figure 3F:
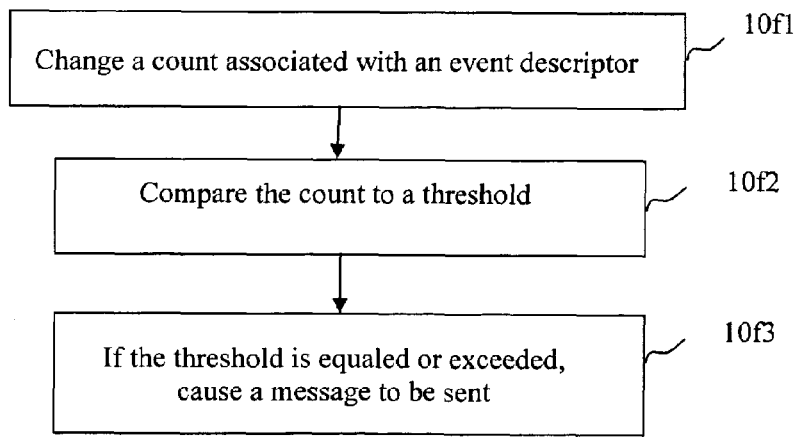

Referring now to FIG. 1, there is shown a preferred embodiment for implementing the method in accordance with the present invention. The first step in the method, represented by block 5 is to provide a memory card. A next step, represented by block 10, is to monitor usage activity for the memory card. This step would be most conveniently performed by monitoring the events, such as power-on events, write events, read events, and any other events that may be advantageous to monitor, occurring/performed to the memory card. In a preferred embodiment, this event monitoring and collecting step 10 would be accomplished by monitoring for and collecting event descriptor information, as well as a count of the number of times that this event descriptor has occurred. This count information and other additional information relating to the event descriptor, such as the source of the usage data, e.g., the memory card or the host, could be collected and associated with the event descriptor. Typical event descriptors might include a powered-on event, and the count associated with this event descriptor would be the number of times that the memory card is powered on. Another event descriptor might be a write event, and the count associated therewith would be the number of times that a write event had occurred for the memory card. Another event descriptor might be a read event, and the count associated therewith would be the number of read event which have occurred to the memory card. Another event descriptor might be physical insertions of the memory card, and the associated count might be the number of physical insertions of the memory card. Another event descriptor might be a measure of how full is the memory card, and the associated count would be a percentage or other representation of how full the memory is. Another event descriptor might be the number of times that data was corrected by the memory card, and the associated count would be the number of such corrections. Another event descriptor would be a writing of an image file such as with an extension like JPEG or TIF, and the associated count would be the number of such image files written to the memory card. A further parameter that could be associated with this image file event descriptor might be the total amount of memory used by image files on the memory card. Another event descriptor might be a music file write such as with an extension like MP3 or WMA to the memory card, and the associated count would be the number of times that such music files were written to the memory card. A further parameter that could be associated with this music file event descriptor might be the total amount of memory used by music files on the memory card. An additional parameter that could be associated with this music file write event might be the total amount of memory used by music file storage. Another event descriptor is a data/text file write event, and the associated count would be the number of such data/text file writes. An additional parameter that could be associated with this data/text file event would be the total amount of memory used by such data/text file write operations. An additional parameter that could be associated with this data/text file event would be the transfer rate performance achieved during such data/text file write operations. Another event descriptor might be the number of times that the memory card was formatted, and the associated count would be the number of times that the memory card was formatted. Another event descriptor might be occurrence of host unique data write events and the associated count would be the number of such host unique data write events.

In addition to event descriptors, this invention, provides for identification fields that are associated with the usage data. These identification fields might be a reseller ID and a customer ID, for example. These fields contain a unique ID sequence (numbers and/or characters) that uniquely identify either the reseller who ordered the card or the customer who ordered the card (e.g. from a web site).

In regard to the above, see the usage information table that lists a plurality of event descriptors, a tabulation associated with the particular event descriptor, a plurality of identification fields and a source of the usage data.

The monitoring and collection of these event descriptors and the accumulation of the count information and other associated parameters would typically be performed by a processor, either on the memory card itself, or in the host, or at some other convenient location. The processor could be conveniently programmed to increment a count or to record another parameter for each occurrence of the one or more event descriptors described above, or for other event descriptors. For example, each time a power-on event occurs, a count for that descriptor could be incremented. Likewise, each time a write event was recognized by the processor, then a counter for that event descriptor would be incremented. The processor would be programmed to recognize the occurrence of each one of these events, such as the powered on event, the write event, the read event, the physical insertions, and the other listed events and record or increment a count for that event, and in a preferred embodiment could also add the memory used by this event to a running total of the memory used by earlier occurrences of that event descriptor. Various other information about the events could also be collected and associated therewith.

It should be noted that the processor may be conveniently programmed to distinguish between various write operations, such as a write operation to a file, a write operation to a data/text file, a write operation of an image file, and a write operation of a music file. By example but not by way of limitation, these different write operation events may be distinguished by the specific type of write command used, or by the specific parameters of the file written to, or by the particular area in the memory card that is written to, or by one or more tags or other designators in the data to be written to the memory card for this event, or by any other convenient method.

The next step in the method, represented by block 20, is to record this usage data. The recording or writing of this usage data may be made to any convenient location accessible by the memory card, the processor, the host, or any other convenient location. In a preferred embodiment, the usage information is written to the memory card itself. The memory card may include a write command for writing such usage data. Alternatively, most memory card standards include an ability to create application unique commands. This ability to create application unique commands is present in a variety of memory standards, including the Multimedia card standard and the Secure Digital card standard. Accordingly, using an application unique command, a vendor unique write command could be created for a particular vendor memory card for writing usage data thereto. Additionally, using an application unique command, a vendor unique read command could also be created to permit access to this recorded usage information.

It should be noted that it is most preferable to store the usage information on the memory card so that usage information will be retained and will be accessible by different hosts. Accordingly, in a preferred embodiment of the present invention, this usage information could be recorded to nonvolatile storage on the memory card or on the host. In a preferred embodiment, the storage location for the usage information data could be a dedicated or reserved area on the memory card or in the host. If the memory card is used for the storage of the usage data, and if the memory card is used with multiple different hosts, then an ID for the host source of the usage data could be associated with one or more of the event descriptors.

Alternatively, if a host is used for storage of the usage data, and if multiple different memory cards are used with the same host, then the use of an ID for the particular memory cards supplying the usage information could be recorded at the host.

The next step in the method, represented by block 30, is to read and select/manipulate the usage information and/or display this usage information using standard device commands or commands created for this purpose. In one embodiment of the present invention, a plurality of the event descriptors may be displayed. Each of these displayed event descriptors is made selectable, so that on selection, additional usage information will be displayed that is associated with that selected event descriptor.

In a further embodiment of the present invention, the reading and displaying step 30 could be performed at the host or at a display on the memory card, and substantially real-time information about usage could be displayed in a window on the screen at the host or at the memory card. By way of example, this substantially real-time information about usage could be an amount of memory used on the memory card, or an amount of memory remaining free on the memory card.

A count for one or more of the event descriptors may be accessed by the processor either at the memory card or at the host and compared to a threshold. If the count for the event descriptor equals or exceeds the threshold, then a message could be caused to be sent. By way of example, the processor at the host or on the memory card could cause a tip or a recommendation to purchase other devices which would operate more effectively with this usage, other information to be displayed automatically on a display screen at the host or potentially at the memory card. This tip might relate to improving the user's downloading techniques or some other aspect of storage. For example, if there is a high memory usage for certain types of files, then a tip that could be provided to the user to use a different type of memory card with more capacity. Additionally, if the read or write event descriptor had a high count associated therewith, thereby indicating a large number of reads or writes, then this may be an indication to the designer to use a faster read or write protocol, or to send a tip on downloading to the user.

Additionally, this user information could be automatically uploaded to a vendor or a designer. Typically, such uploading would only occur with the permission of the user. The uploading process would, by way of example, associate the customerID or resllerID information fields with the usage information. In this embodiment, the vendor facing organization (as opposed to the user's memory card or host processor) could then provide the customer tips for using their device more effectively, or for purchasing other devices which would operate more effectively for the user's purposes. As an alternative, the customer could authorize the uploading of his usage data anonymously. This usage data would then be aggregated with other usage data for the device and then used by designers to improve the operation of the memory card and/or the host. As a further alternative, if the user was in a large organization, then the particular user ID could be stripped off of the information but the ID for the organization could be associated with the user data so that administrators could determine how the memory cards in their organization are being used. Note that these different alternatives are particularly effective when uploading via the internet or a company network. Various histograms could be created based on the event descriptors and their associated counts after they had been aggregated across a large number of users in the organization.

Accordingly, an invention has been disclosed for storing usage information for a memory card, either at a host or on the memory card itself. This usage information enables the automatic generation and display of tips to the user. This usage information for the memory card also enables both product generation and customer facing organizations to profile the use of personal storage in a cross section of host devices. This usage storage enables designers/vendors to deliver value through more efficient storage techniques and better product designs. Accordingly, it is possible to understand how a storage device or memory card is used across multiple hosts. There are a variety of different uses for this type of data. By way of example, the insertion event descriptor could be used to determine the robustness needed for the metallic interface connections on the memory card. For example, if the physical insertion event descriptor has a high count associated therewith, meaning that the card has been inserted into a host device many times, then this information could be used as an indication that a more robust metallic interface connection should be used for the memory card, e.g., making the metallic interface thicker, or to having more surface area, or to changing the material, or changing a spring design.

USAGE INFORMATION TABLE

| Event Descriptors | Tabulation | Source of Usage Data |
|---|---|---|
| Power-on Time | clock counts | card |
| # times powered on | count | card |
| # write operations (file) | count | card |
| # read operations (file) | | |
| # insertions | | |
| Measure of How Full | % | card |
| # times data needs to be corrected | count | card |
| # image files written by extension (jpeg, tif etc.) | count | host |
| # music files written (mp3, mid. etc.) | count | host |
| # data/text files written | count | host |
| # times formatted | count | host |
| # Host Unique Data | count | host |
| Reseller ID number | number/character sequence | host (Label Card) at time card is sold |
| Customer ID Number | number/character sequence | host via user at time card is sold |

FIG. 2 is a schematic illustrating a portable memory card 200 for use with an electronic device 240. The memory card includes a processor 210, dedicated memory area 220 and display 230. The display 230 may be a screen or window, for example.

FIGS. 3a, 3b, 3c, 3d, 3e, 3f, 3g, 3h, 3i, 3j, and 3k provide examples of step 10 of FIG. 1. FIGS. 3a, 3b, 3c, 3d, 3e, 3f, 3g, 3h, 3i, 3j, and 3k illustrate these examples steps as steps 10a, 10b, 10c, 10d, 10 e, 10f3, 10g, 10h, 10i, 10j, and 10k1-10k2, respectively.

Figure 4:
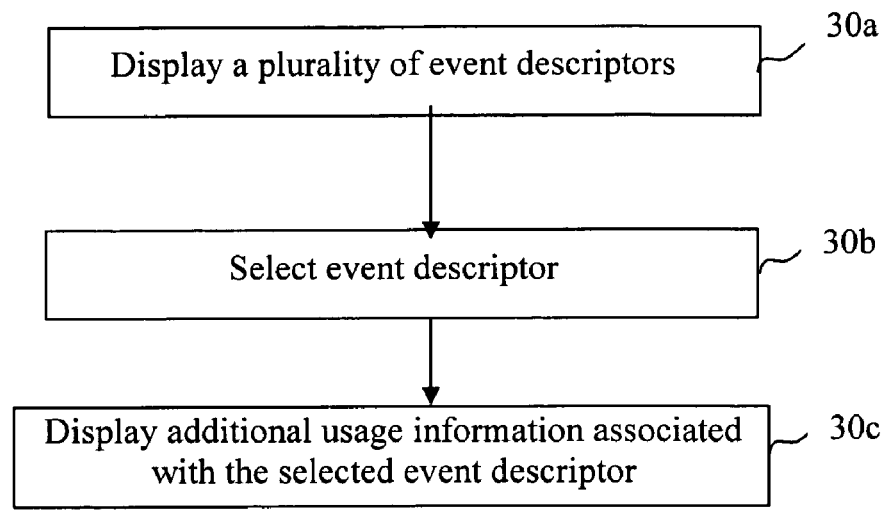
FIG. 4 is a schematic block diagram providing examples of step 30 of FIG. 1.

FIG. 4 provides examples of step 30 of FIG. 1, and in particular illustrates steps 30a, 30b, and 30c.

Figure 5:
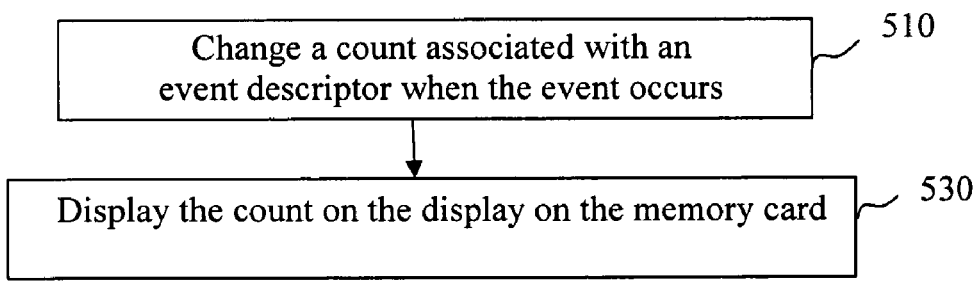
FIG. 5 is a schematic block diagram providing examples of steps 10 and 30 of FIG. 1 in combination.

FIG. 5 provides an example of steps 10 and 30 of FIG. 1 in combination, and in particular illustrates steps 510 and 530.

The foregoing description of a preferred embodiment of the invention has been presented for purposes of illustration and description. It is not intended to be exhaustive or to limit the invention to the precise form disclosed, and modifications are variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A method for storing memory card usage information on a memory card, comprising:
    collecting information about usage of the memory card using a processor;
    recording the information about usage of the memory card in an area of memory of the memory card;
    accessing the information about usage of the memory card from the area of memory of the memory card using a processor wherein there are a plurality of event descriptors and wherein said accessing step comprises displaying a plurality of the event descriptors on a display on the memory card, wherein each of the displayed plurality of events descriptors is selectable, so that on selection, additional usage information will be displayed that is associated with that selected event descriptor; and displaying the information about the usage of the memory card on the display on the memory card.

2. The method as defined in claim 1, wherein the collecting step comprises monitoring write events, read events and power-on events.

3. The method as defined in claim 1, wherein the collecting step comprises changing a count associated with an event descriptor when the event occurs.

4. The method as defined in claim 3, wherein the collecting step further comprises storing a value parameter associated with said event descriptor when the event occurs.

5. The method as defined in claim 3, wherein the collecting step comprises changing a running total associated with said event descriptor when the event occurs.

6. The method as defined in claim 1, wherein the recording step comprises recording the information about usage in a dedicated area in said memory card.

7. The method as defined in claim 1, wherein the collecting step comprises changing a count associated with an event description when the event occurs; and wherein the accessing step comprises displaying the count on the display on the memory card.

8. The method as defined in claim 1, further comprising the step of creating write and read commands allowing a host to store the information about usage and read that information.

9. The method as defined in claim 1, wherein the collecting step comprises changing a count associated with an event descriptor when the event occurs; and further comprising the steps of comparing the count to a threshold, and if the threshold is equaled or exceeded, then causing a message to be sent.

10. A system for storing memory card usage information on a memory card, comprising:

an area of memory of the memory card for recording information about usage of the memory card;

processor for collecting the information about usage of the memory card for accessing the information about usage of the memory card from the memory card wherein collecting information further comprises counting a number of times an image file was written to the memory card; and a display on the memory card for displaying the information about the usage of the memory card.

11. A method, comprising:

collecting information about usage of a portable memory card in an electronic device using a processor wherein collecting information further comprises counting a number of times an image file was written to the memory card;

recording the information about usage of the memory card in an area of memory on the memory card itself; and displaying the information about the usage of the memory card on a display on the memory card.

12. The method of claim 11 wherein collecting information further comprises counting physical insertions of the memory card into the electronic device.

13. The method of claim 11 wherein collecting information further comprises counting a number of times music files were written to the memory card.

14. The method of claim 11 wherein collecting information further comprises tracking a number of times the memory card is formatted.

15. A method, comprising:

providing a portable memory card;

monitoring usage of the memory card using a processor;

collecting information about usage of the portable memory card wherein collecting information further comprises counting a number of times an image file was written to the portable memory card:

storing the usage of the memory card in an area of memory on the memory card; and displaying the usage of the memory card on a display on the memory card.

16. The method of claim 15 wherein displaying the usage further comprises displaying the usage on a window on the memory card.

17. The method of claim 15 wherein displaying the usage further comprises displaying the usage on a screen on the memory card.

18. The method of claim 15 wherein monitoring usage comprises monitoring an amount of memory used on the memory card and monitoring an amount of memory remaining free on the memory card.

19. The method of claim 15 wherein providing a portable memory card further comprises providing the portable memory card in a digital camera.

20. A method for storing memory card usage information on a memory card, comprising:

collecting information about usage of the memory card using a processor wherein collecting information further comprises counting a number of times an image file was written to the portable memory card;

recording the information about usage of the memory card in an area of memory of the memory card; and accessing, using a processor, the information about usage of the memory card from the memory card, wherein the information about usage of the memory card comprises at least one of a measurement of how full the memory card is and the number of times data was corrected by the memory card.

21. The method of claim 20, wherein the information about usage of the memory card comprises a measurement of how full the memory card is.

22. A system for storing memory card usage information on a memory card, comprising:

an area of memory of the memory card for recording information about usage of the memory card; and a processor for collecting information about usage of the memory card and for accessing the information about usage of the memory card from the area of memory of the memory card, wherein collecting information further comprises counting a number of times an image file was written to the portable memory card and wherein the information about usage of the memory card comprises at least one of a measurement of how full the memory card is and the number of times data was corrected by the memory card.

23. The system of claim 22, wherein the information about usage of the memory card comprises a measurement of how full the memory card is.

* * * * *

UNITED STATES PATENT AND TRADEMARK OFFICE
CERTIFICATE OF CORRECTION

| | | |
|---|---|---|
| PATENT NO. | : 7,461,204 B2 | Page 1 of 1 |
| APPLICATION NO. | : 09/996720 | |
| DATED | : December 2, 2008 | |
| INVENTOR(S) | : Andrew M. Spencer et al. | |

It is certified that error appears in the above-identified patent and that said Letters Patent is hereby corrected as shown below:

In column 6, line 35, delete "10f3," and insert -- 10f1-10f3, --, therefor.

In column 8, line 10, in Claim 15, delete "card:" and insert -- card; --, therefor.

Signed and Sealed this

Twenty-third Day of June, 2009

JOHN DOLL
*Acting Director of the United States Patent and Trademark Office*